April 21, 1936. G. C. WESTBY 2,038,399
PROCESS FOR TREATING SILICEOUS MATERIALS
Filed May 5, 1931
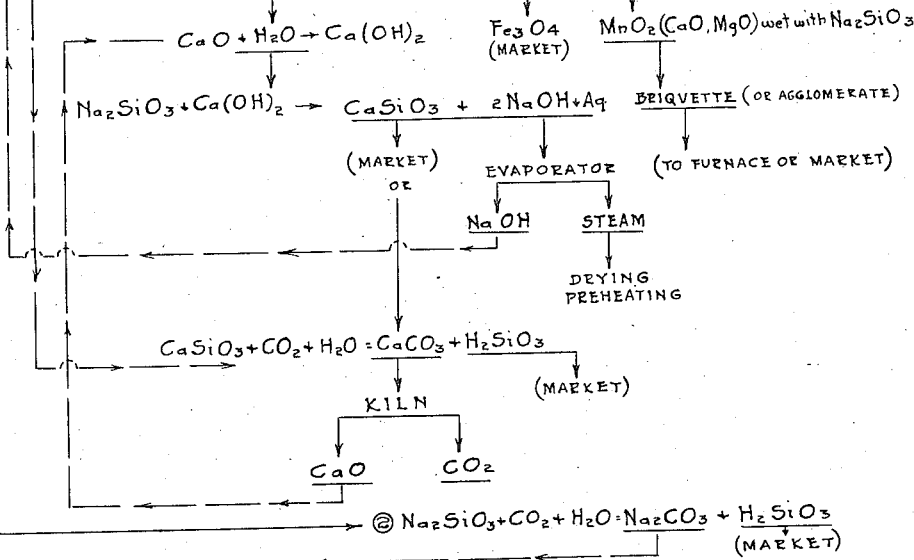
INVENTOR
George C. Westby
BY
Edward E. Barnes
ATTORNEY Patented Apr. 21, 1936

2,038,399

UNITED STATES PATENT OFFICE 2,038,399

PROCESS FOR TREATING SILICEOUS MATERIALS

George C. Westby, Seattle, Wash.

Application May 5, 1931, Serial No. 535,193

12 Claims. (Cl. 23—145)

This invention relates to a process of treating silica-bearing materials for production, through novel chemical and physical reactions, of marketable products, and extracting, in oxide forms, such metallic elements as may be present in the various chemical formulations of matter.

Recognition being had to the relatively low selling price of the products, and importance of an adequately high return, the primary object of the invention, generally stated, is the provision of a most inexpensive and efficient process and one which may very readily be practiced with standardized equipment.

More specific objects, sequentially stated, are the accommodation to the needs of ore treatment, that a simplified flow sheet be afforded in which the plant therefor, in minimizing the demand for skilled labor, may be highly mechanized, that the reagents used be the cheapest obtainable, that the process, as far as possible, regenerate its own reagents that regeneration of the reagents be developed co-incident with by-products, and that substantially all chemical or physical reactions obtained be used in the advancement of the process.

The accompanying drawing illustrates the general process of the invention as summarized on a flow sheet.

Reference had to such flow sheet with a view towards clarifying the procedure set forth therein, I illustrate an assumed proportionate arrangement of elements, some of which are present in all instances, and others of which may or may not be present or may be replaced with other elements more or less equivalent in action, depending upon the particular deposits.

The ores I have subjected to experiment contained manganese largely in the form of Bementite $(MnSiO_3)_2H_2O$, this ore being found in relatively large quantities on the north and east slopes of the Olympic Mountains in Washington and is considered to be very refractory as are other metallic silicate deposits such as zinc silicate (Willemite) and copper silicate (Chrysocolla). However, such ores are particularly amenable to my process.

In carrying out the present process, I find it desirable to utilize sodium aluminum silicates of which Feldspar $(NaAlSi_3O_8)$ is an example. These minerals replace sodium lost in the leaching operations and supply aluminum which is of value in forming with other products of the process, a by-product of Portland cement raw material. The alkili aluminum silicates are present in many ores and in country rock such as leucite and granite and therefore constitute a cheap source of material for my needs, making it possible to avoid purchase of expensive alkaline reagents.

For experimental purposes I have used a manganese silicate ore primarily because of the difficulty heretofore encountered in working the same and for the reason that it seemed best suited for the flow sheet in bringing out the novel and heretofore unattained results especially desired.

Proceeding, the ore constituted as shown, is crushed, subjected to hot fine grinding (approximately 200 mesh) with the alkaline reagent. Hot fine grinding with the alkaline reagent in solution is preferably resorted to in order to avoid uneconomic features of dry grinding the chemical action being accelerated by reason of heat, agitation abrasion and comminution with every particle of ore being intimately wetted with the reagent.

As represented in the flow sheet the primary alkaline grinding results in initiating the production of water glass $(Na_2O_3SiO_2Aq)$. This with the residual ore particles and alkali excess is roasted at a temperature approximating 700° C. If desired, carbon or other suitable reducing agents are introduced in order to produce magnetic iron oxide $(Fe_3O_4)$ from Hematite $(Fe_2O_3)$ and also to directly develop an oxide of manganese.

The material delivered from the roaster is generally discharged hot and in the presence of carbonaceous matter into an alkaline liquor such as sodium carbonate, sodium hydrate, or potassium carbonate or hydrate derived from another stage of the operation, and is disintegrated, forming principally a moderately concentrated alkaline solution of water glass, a light flocculent mass of manganese hydrate and a ferruginous residue with possibly lime and remaining siliceous material. If desired, the manganese hydrate may be separated by flotation or decantation methods or it may be left with the residues to form a product suitable for the manufacture of ferromanganese. Since it is moist with water glass, it may be easily briquetted or agglomerated.

Where there is an accessible market, it would be good commercial policy to barrel and sell the water glass produced in the process, particularly in the event that a cheap source of sodium sulphate or carbonate is nearby, but under other conditions, the course shown on the flow sheet is followed. In the latter case, the alkaline solution is brought to its original strength by charging a slight excess of lime, thus regenerating sodium hydrate and recipitating calcium silicate in accordance with the equation—

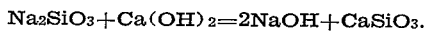
$Na_2SiO_3 + Ca(OH)_2 = 2NaOH + CaSiO_3.$

The regenerated alkali is returned to the circuit after filtration from the calcium silicate.

The disposal or use of the calcium silicate is not a difficult problem, since this compound is the principal constituent of Portland cement and may be profitably used in this connection. The subsidiary substances are present in the ore and may be easily introduced to form an excellent finely divided artificial material for the manufacture of Portland cement.

However, if practical considerations make the plan desirable, it is an essential alternative of the process that calcium carbonate may be regenerated from the wet calcium silicate and the carbon dioxide derived from the roasting of calcium carbonate in the earlier cycle. The thermochemical equation is:—

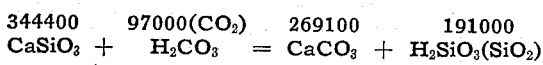
$$\begin{array}{cccc} 344400 & 97000(CO_2) & 269100 & 191000 \\ CaSiO_3 + & H_2CO_3 & = CaCO_3 + & H_2SiO_3(SiO_2) \end{array}$$

In the above case the $CaCO_3$ appears as a residue while the silicic acid is in pseudo solution.

By the methods outlined, it is obvious that the process is largely self-contained, in which all essential reagents and material used are regenerated.

The process also develops very useful by-products, which might be immediately marketed where economic considerations indicate this step to be desirable.

Ordinary iron or wooden tanks of any desired size may be used in carrying out the few steps of the process.

Obviously in operation, the procedure in connection with the marketing of by-products or their use in regeneration would be determined by the ordinary laws of supply and demand. Normally, that portion of the by-products for which there was no insistent demand would be returned to the regenerative cycles and the deficiency of alkali would be derived from the cheapest source of supply. (Incidentally, in some cases this might be contained in the ore.)

The flexibility of the process, as previously noted, permits of important variations of the constituents of the raw material and final product, without radical change of the plant equipment. But, in any adaptation, so far as the Olympic ores are concerned, fine-grinding (200 mesh), moderately high temperatures, abrasion during treatment and hot solutions are eminently desirable. Under the established conditions, the speed of reactions is rapid, filtration clean and effective and the manganiferous or other residue particularly adaptable to any desired refining treatment.

In the event that a clean manganese product was called for, the general procedure outlined would be modified by first cooling the roasted mass before dissolving, then separating the manganese and water glass from the ferruginous and calcareous residue by solution in cold water. The process would be expressed in the following manner:—

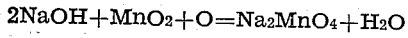
$2NaOH + MnO_2 + O = Na_2MnO_4 + H_2O$

The $Na_2NnO_4$ in a strong boiling solution would be then decomposed in accordance with the equation:—

$2Na_2MnO_4 + 4H_2O = 2MnO(OH)_2 + 4NaOH + O_2$

The hot concentrated alkaline solution of water glass would then be treated in consideration of the economic conditions obtaining at any given time.

It might be emphasized that vitally important features of the process are its adaptability to economic conditions and the marketable by-products arising from the treatment, together with possible regeneration of all reagents applied in the process.

While numerous attempts have been made to commercially convert ore of the character set forth, into marketable by-products, I am unaware of any prior development capable of commercial working. I am furthermore unaware of any other development utilizing the standardized apparatus designated, for the purpose described.

For such reason, it is my intention to confine myself to no particular class or constituents of ore, and I have eliminated, as far as possible, the mention of any particular physical agency to afford the chemical results achieved.

What I claim, is,—

1. The process of treating manganiferous silicate ores which consists in crushing the ore and fine grinding the same to an approximate 200 mesh together with an alkaline reagent solution in the presence of heat to produce water glass by the initial reaction of the reagent with silica oxide, passing said water glass, the excess reagent and the finely ground particles through a roasting furnace to afford further reactions of the silica formations with the reagent, introducing said matter together with carbonaceous matter into a hot leach to extract the manganese and regenerate the reagent, filtering said manganese from the water glass, and treating the water glass with calcium hydroxide to precipitate calcium silicate, said calcium silicate being reacted upon by carbon dioxide to regenerate the calcium hydroxide and carbon dioxide for re-entry to the system with a production of silicic acid.

2. The process of treating manganiferous silicate ores which consists in crushing and fine grinding the ore together with a solution of sodium hydroxide to produce water glass by the initial action of the reagent on the silica of the ore, passing said water glass, the excess hydroxide and the finely ground unattacked particles of the ore through a roasting furnace in the presence of carbonaceous matter to afford further reaction between the silica formations and the hydroxide, introducing the same from the roast into a hot liquid to extract the metals of the ore as a product from such reactions as may have occurred with the hydroxide in the roast, filtering to obtain the metal residue from the water glass, and treating the water glass with a solution of calcium hydroxide to regenerate the sodium hydroxide and produce calcium silicate.

3. The process of treating manganiferous silicate ores which consists in crushing and fine grinding the ore together with a solution of sodium hydroxide to produce water glass by the initial action of the reagent on the silica of the ore, passing said water glass, the excess hydroxide, and the finely ground unattacked particles of the ore through a roasting furnace to afford further reaction between the silica formations and the hydroxide, leaching the same in the presence of carbonaceous matter subsequent to the emission from the roast to extract the metal of the ore as a product from such reactions as may have occurred with the hydroxide in the roast, filtering to obtain the metal residue from the water glass, and treating the water glass with carbon dioxide to produce silicic acid and sodium carbonate for regenerating hydroxide reagent by addition of lime.

4. The process of treating manganiferous silicate ores which consists in crushing and fine grinding the ore together with a solution of sodium hydroxide to produce water glass by the initial action of the reagent on the silica of the ore, passing said water glass, the excess hydroxide and the finely ground unattacked particles of the ore through a roasting furnace to afford further reaction between the silica formations and the hydroxide, introducing the same from the roast in the presence of carbonaceous matter into a hot liquid to extract the metal of the ore as a product from such reactions as may have occurred with the hydroxide in the roast, and filtering to obtain the metal residue from the water glass.

5. The process of treating a metallic silicate, which consists in obtaining a reaction of the silicate with a suitable reagent solution to produce water glass and subsequently inducing a reaction through the introduction of carbonaceous matter to precipitate the metal in its oxide state by a regeneration of the reagent whereby the metallic oxide may be extracted from the reagent solution.

6. The process of treating metallic silicate ores which consists in crushing the ore together with a solution of sodium hydroxide to produce water glass by the initial action of the reagent on the silica of the ore, passing said water glass, the excess hydroxide, and the unattacked particles of the ore through a roasting furnace to afford further reaction between the silica formations and the hydroxide, and introducing the same from the roast in the presence of carbonaceous matter into a hot liquid to extract the metal of the ore as a product from such reactions as may have occurred with the hydroxide in the roast.

7. The process of treating metallic silicate ores which consists in crushing the ore together with an alkaline reagent solution to produce water glass by the initial action of the reagent on the silica of the ore, passing said water glass, the excess reagent, and the unattacked particles of the ore through a roasting furnace to afford further reaction between the silica formations and the reagent, leaching the same in the presence of carbonaceous matter subsequent to the emission from the roast to extract the metal of the ore as a product from such reactions as may have occured with the reagent in the roast, and treating the water glass with carbon dioxide to produce silicic acid and sodium carbonate for regeneration of the alkaline reagent.

8. In a process of treating metallic silicate ores which consists in an initial commingling of a solution of sodium hydroxide with the ore to produce water glass by the action of the hydroxide on the silica of the ore, the successive steps of passing the water glass, the excess hydroxide, and the unattacked particles of the ore through a roasting furnace in the presence of carbonaceous matter to afford further reaction between the silica formations and the hydroxide, introducing the same from the roast into a hot liquid to extract the metals of the ore as a product from such reactions as may have occured with the hydroxide in the roast, separating the metal residue from the water glass, and treating the water glass with a solution of calcium hydroxide to regenerate the sodium hydroxide for re-entry of the same to the system.

9. In a process of treating metallic silicate ores which consists in grinding the ore and introducing sodium hydroxide as a reagent solution to produce water glass and a salt of the metal as a result of the reaction of the reagent solution with the silica of the ore, the steps of treating the salt of the metal, the water glass, excess hydroxide, and unattacked particles of the ore in the presence of carbonaceous matter and under the influence of heat to precipitate the metal of the ore in its oxide state and regenerating the sodium hydroxide for re-entry of the same to the system.

10. In a process of treating metallic silicate ores which consists in commingling the ore in a finely ground state with a suitable alkaline reagent solution to produce water glass and a salt of the metal as a result of the reaction of the solution with the silica of the ore, and subsequently inducing a reaction on the salt of the metal to precipitate the metal in its oxide form, the successive steps of regenerating the alkaline reagent for re-entry of the same to the system which consists in the introduction of lime to the water glass to extract the silica content of the same in the development of calcium silicate, and in turn regenerating the lime from the calcium silicate for re-entry of the lime to the system as the agent for regenerating the alkaline reagent solution.

11. The process of treating manganiferous silicate ores which consists in commingling the ore in a pulverulent state with sodium hydroxide to form sodium manganate with an extraction of the silica content by a production of water glass, and subsequently breaking down the sodium manganate to precipitate the mineral content of the same in an oxide state by leaching the sodium manganate in the presence of carbonaceous matter.

12. In the process of treating manganiferous silicate ores in which the ores ore commingled in a pulverulent state with an alkaline reagent to extract the silica content of the ores by a production of water glass, the reagent being regenerated for re-entry to the system, the step of inducing a reaction through the introduction of carbonaceous matter whereby the metal of the ores may be precipitated in its oxide state and extracted from the regenerated reagent.

GEORGE C. WESTBY.